Jan. 5, 1932.  A. J. DENNISS ET AL  1,839,953
COMBINED SHUTTER AND FILM WINDING MECHANISM FOR PHOTOGRAPHIC CAMERAS
Filed Nov. 21, 1929   3 Sheets-Sheet 1

INVENTORS.
A. J. DENNISS.
W. DOCKREE.
By Fetherstonhaugh & Co.
ATTYS.

Jan. 5, 1932.  A. J. DENNISS ET AL  1,839,953
COMBINED SHUTTER AND FILM WINDING MECHANISM FOR PHOTOGRAPHIC CAMERAS
Filed Nov. 21, 1929  3 Sheets-Sheet 2

INVENTORS.
A. J. DENNISS.
W. DOCKREE.
By Netherstonaugh Co
ATTYS.

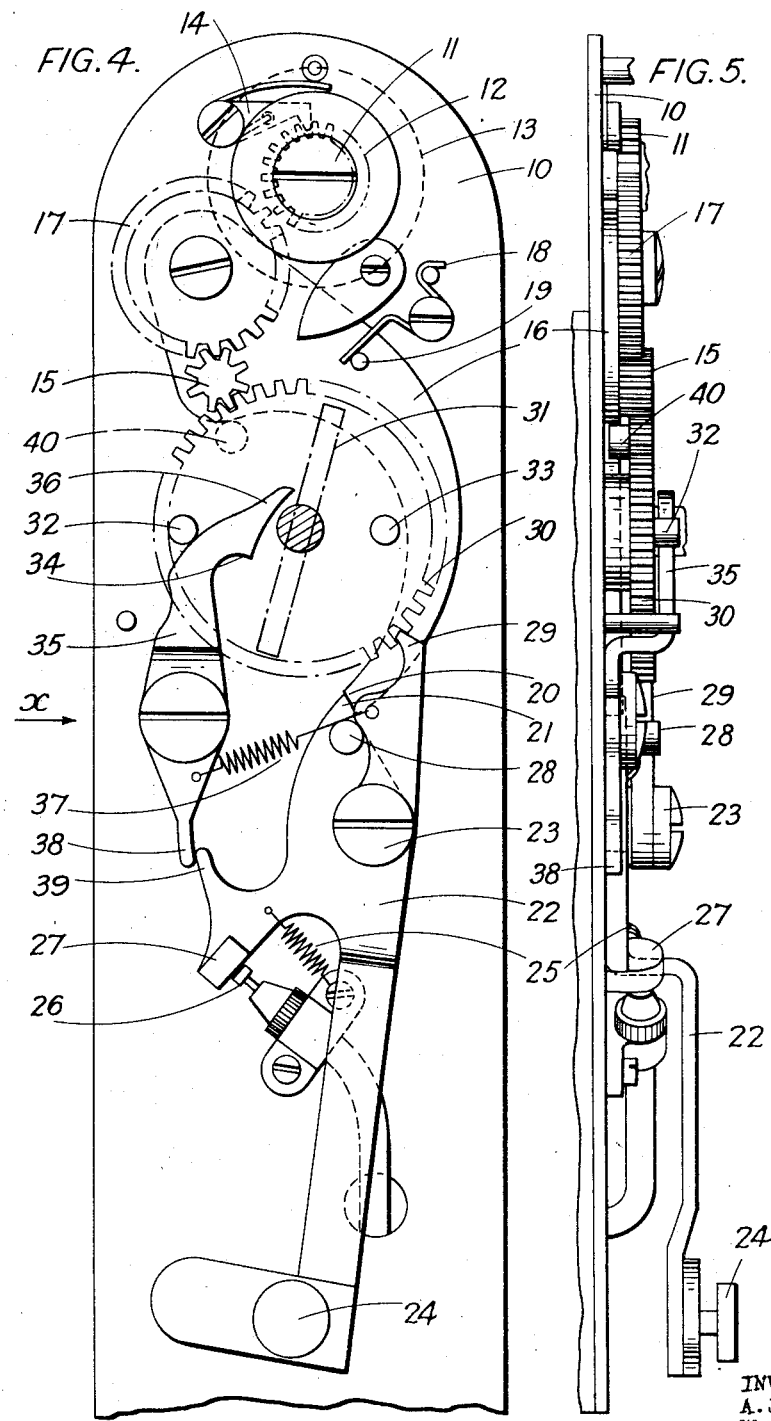

Patented Jan. 5, 1932

1,839,953

UNITED STATES PATENT OFFICE

ALFRED JOSEPH DENNISS, OF CHINGFORD, AND WALTER DOCKREE, OF LEYTON, LONDON, ENGLAND, ASSIGNORS TO THE HOUGHTON-BUTCHER MANUFACTURING COMPANY LIMITED, OF LONDON, ENGLAND, A LIMITED LIABILITY COMPANY OF ENGLAND

COMBINED SHUTTER AND FILM WINDING MECHANISM FOR PHOTOGRAPHIC CAMERAS

Application filed November 21, 1929, Serial No. 408,830, and in Great Britain January 18, 1929.

This invention relates to roll film photographic cameras of the type having mechanism comprising a train of wheels connected to the film winder and to the shutter spindle and driven by a hand operated wheel whereby the roll film is simultaneously advanced with the setting of a focal plane shutter. An object of the present invention is to provide a mechanism of this kind in which a varying amount of movement may be imparted to the shutter setting mechanism according to the kind or duration of exposure required, while a constant movement is in every case given to the film winder, that is to say enough movement to bring a fresh portion of the film into position for exposure.

According to the present invention in a camera of the type referred to mechanism is provided wherein the shutter spindle at the appropriate time is rendered independent of the film winder by automatically freeing the latter when it has been wound to a fresh exposure position, the shutter spindle being allowed to proceed independently until fully "set" for either instantaneous or "time" exposure, and the film winder being kept free from the train of wheels while an exposure is being made.

The mechanism preferably comprises a toothed wheel carried by the shutter winding spindle and another by the film winder, an intermediate toothed wheel normally in mesh with both of the first named wheels and adapted to transmit motion from one to the other in setting the shutter and winding the film, said intermediate toothed wheel being mounted so as to be moved bodily out of engagement with the wheel on the film winder when the latter has brought a fresh portion of film into position for exposure and also when the shutter-release is operated, thereby enabling the film winder to remain stationary during both the final setting motion of the shutter and its return motion during the exposure.

In one form of construction the intermediate toothed wheel is mounted towards one end of a spring-loaded lever which pivots about the centre of the shutter spindle and is provided with a cam surface engaged by a stud or the like on the hand-operated toothed wheel when the film has been wound forward to a fresh exposure position, further winding causing the lever to be moved so as to disengage the intermediate toothed wheel from that on the film winder and allow the shutter to be wound independently to its fully "set" position. The end of the lever opposite to that which carries the intermediate toothed wheel is located for engagement by the shutter-release or a part actuated thereby so as to hold the intermediate toothed wheel out of mesh with the wheel on the film winder while an exposure is being made.

The above and further features of the invention will be more fully explained with reference to the accompanying drawings which illustrate a preferred form of construction in accordance with the invention.

Fig. 4 is a similar view showing the parts at the commencement of a "time" exposure, and Fig. 5 is a view of the mechanism taken at right angles to Fig. 4 and looking in the direction of the arrow.

Referring to these drawings:—

Figure 1:
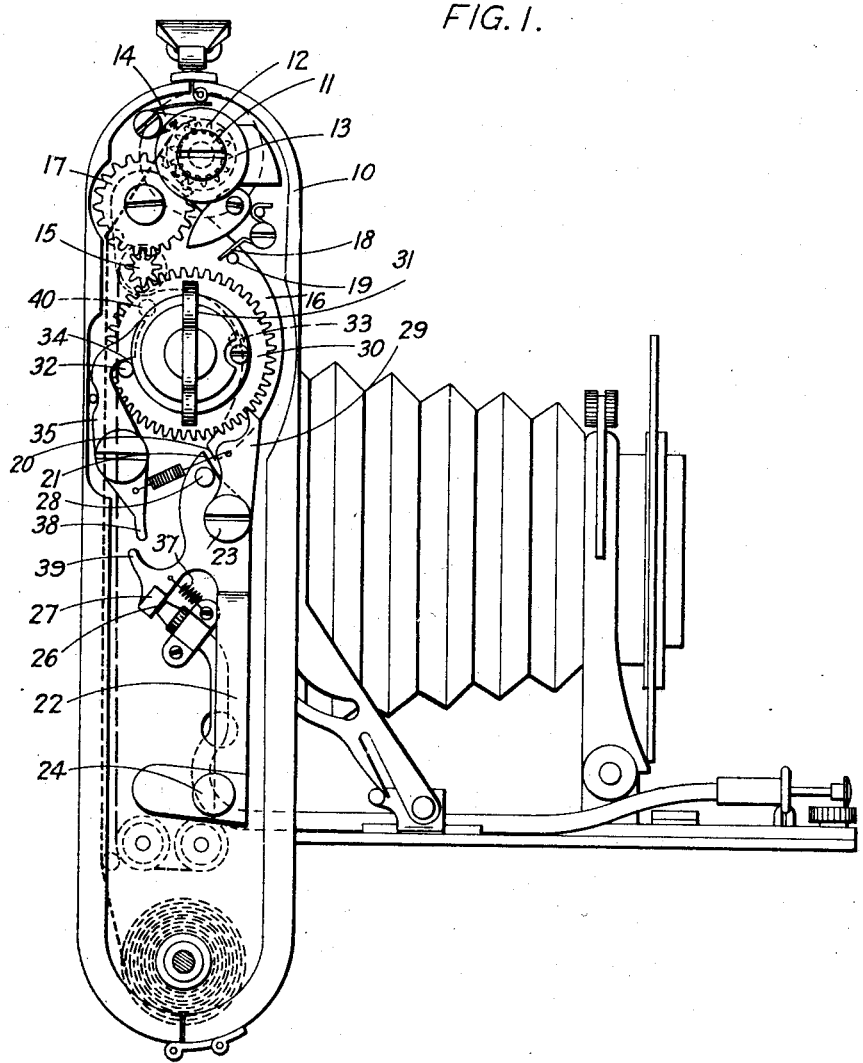
Fig. 1 is a side elevational view of a folding camera with one of the side plates removed to show the mechanism of the present invention.

10 designates the camera body, 11 the spindle for the take-up spool for a roll film, 12 a toothed wheel and 13 a hand wheel both fast on said spindle, the toothed wheel 12 being provided with a spring-loaded detent 14. 15 is a toothed wheel fast on the shutter spindle by which a self-capping focal plane shutter is set. Rotatably mounted on a lever 16 pivoted on the centre of the wheel 15 is an intermediate toothed wheel 17 normally held in mesh with both of the wheels 11 and 15 by means of a spring 18 pressing against a stud 19.

The lever 16 has a curved downward extension terminating in a nose 20 lying in front of a nose 21 which is part of a lever 22 pivoted at 23 and provided at its lower end with a stud 24 which projects through the side of the camera body to act as a shutter release. This lever 22 may also be operated against the tension of a spring 25 by the Bowden wire release 26 engaging an abutment 27 which is part of the lever 22. The latter is also furnished with a stud 28 which acts on an arm 29 to withdraw a detent from a toothed wheel 30 which is furnished with a key 31 external to the camera body for winding purposes.

This wheel 30 is in permanent mesh with the wheel 15 on the shutter spindle and drives the train of wheels for simultaneous shutter setting and film winding.

The wheel 30 also carries two studs 32 and 33 at different radial distances from its centre, the stud 32 acting as a stop at the end of an exposure by coming into contact with the inner edge 34 of a lever 35, the upper end 36 of which is kept pressed outwardly or to the left on the drawings by a spring 37. The other stud 33 acts to stop the shutter in the open position at the end of the first part of a "time" exposure by coming into contact with the part 34 which at such time is forced to the right by the pin 32 as will be explained in more detail later. The lever 35 is provided with a downward extension 38 located for engagement by a horn 39 forming part of the shutter release lever 22.

A third stud 40 fixed to the underside of the wheel 30 is placed so as to come into contact with the edge of the lever 16 when the shutter is being set and the film advanced. The stud 40 traveling over the curved edge of lever 16 forces the lower end of said lever to the right and disengages the intermediate wheel 17 from the wheel 12 to enable the shutter setting motion to continue independently after the film has been fully wound forward for a fresh exposure.

The operation of the mechanism is as follows:—

When the roll film is to be advanced for a fresh exposure and the focal plane shutter simultaneously set for either an instantaneous or "time" exposure the key 31 is turned in the direction indicated by the arrow. At the commencement of this motion the wheels 12, 17, 15 and 30 are all in mesh and the stud 32 is in contact with the part 34.

Figure 2:
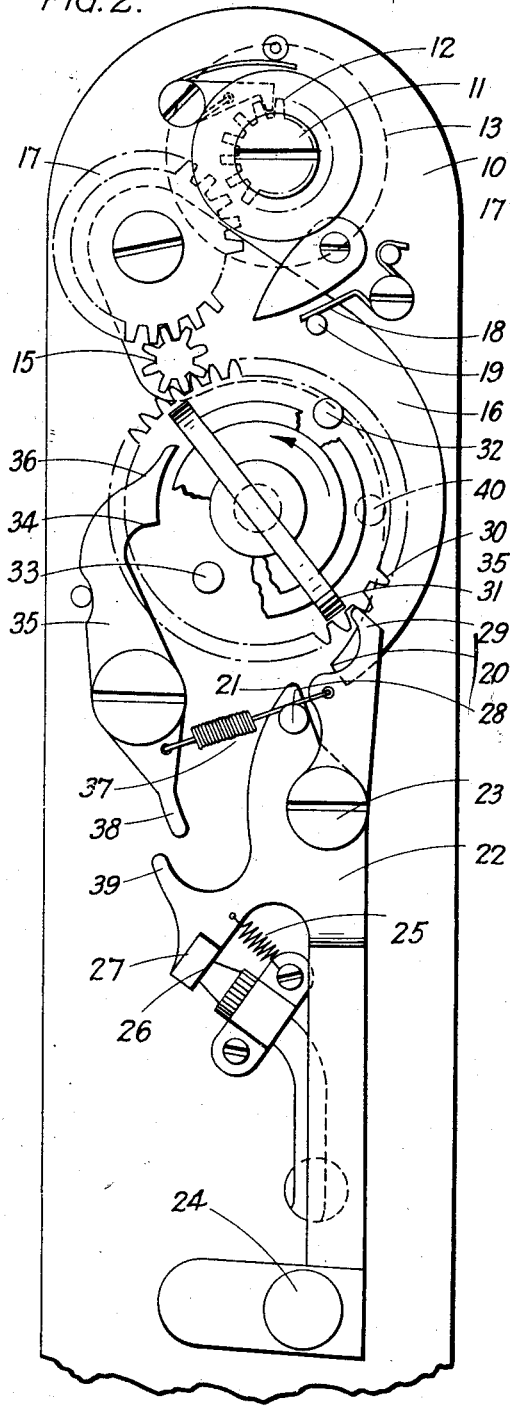
Fig. 2 is a local view to a larger scale of the mechanism on one side of the camera body showing the parts in a position in which the film has been fully wound ready for a fresh exposure whilst the shutter is only partly set.

When the parts come to the position shown in Fig. 2 the film has been fully advanced for a fresh exposure but the shutter is not yet fully set. Winding is continued therefore until the stud 32 reaches the position shown in Fig. 3 and during this latter part of the motion the intermediate wheel 17 is moved by stud 40 and lever 16 out of mesh with the wheel 12 leaving the latter and the film winder stationary.

Figure 3:
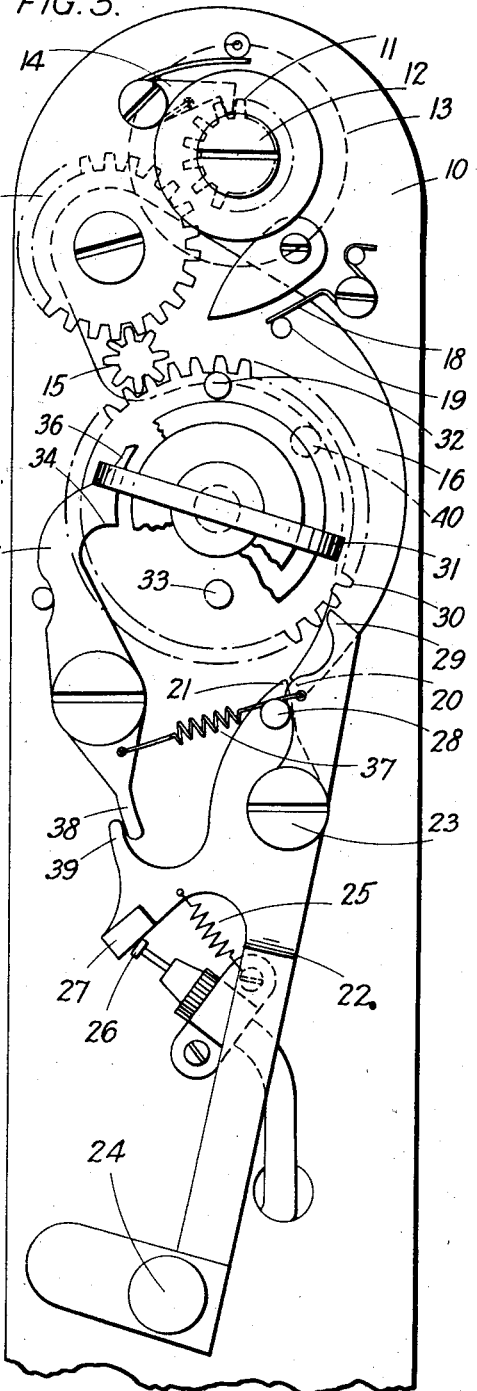
Fig. 3 is a similar view showing the parts at the commencement of an instantaneous exposure.

Fig. 3 shows the parts at the commencement of an instantaneous exposure. Operation of either shutter release 24 or 26 moves the parts to the position shown in Fig. 3 the stud 28 pushes the detent 29 clear of the wheel 30 and at the same time the nose 21 has engaged the nose 20 on the downward extension of the lever 16 and holds the intermediate wheel 17 out of mesh with the wheel 12. The wheels 15, 17 and 30 rotate in the reverse sense until the stud 32 comes into contact with the part 34 which terminates the exposure.

For a "time" exposure the winding is continued beyond the point shown in Fig. 3, the stud 32 moving round until it comes into contact with the outer edge of the part 36. Further movement forces the upper end of the lever 35 inwards until the part 34 lies in the path of the stud 33 as shown in Fig. 4, which indicates the position of the parts with the shutter fully set for a "time" exposure. The movement of the lever 35 has brought its lower end 38 outside the horn 39 on the lever 22 so that when the shutter release is operated the horn 39 moves up inside the extension 38 and retains the part 34 in the path of the stud 33 until the latter strikes it and stops rotation of the wheel 30. The detent 29 then re-engages the wheel 30 and when the shutter release is freed the lever 35 moves back to normal position in which the part 34 is in the path of the stud 32.

On again operating the shutter release the "time" exposure is completed.

It may be noted that the film winder spindle 11 can be turned independently of the shutter by means of the hand wheel 13, the teeth of the wheel 12 as it turns forcing back the intermediate wheel 17.

What we claim is:—

1. In a roll film photographic camera employing a focal plane shutter, the combination with the film winder spindle and the focal plane shutter winding spindle, of mechanism including a train of gears connected to both spindles for simultaneously advancing the roll film and setting the shutter, means for automatically disengaging the film winder spindle from the gear train upon the film roll being wound to a fresh exposure position during the advancement of the shutter to the set position, and means for retaining the film winder in the disengaged position from the gear train during the actuation of the shutter to make an exposure.

2. In a roll film photographic camera as claimed in claim 1, the gear train comprising a toothed wheel carried by the shutter winding spindle, a toothed wheel carried by the film winder spindle, an intermediate toothed wheel normally in mesh with both the aforesaid toothed wheels, means for rotating the toothed wheel on the shutter winding spindle, the rotation of which through the medium of the intermediate toothed wheel rotates the toothed wheel on the film winding spindle, means for mounting the intermediate toothed wheel for moving it out of engagement with the toothed wheel on the film winding spindle upon the film being wound to present a fresh portion for exposure, a shutter release, and means actuated thereby for retaining the intermediate toothed wheel out of engagement with the toothed wheel on the film winding spindle during the actuation of the shutter to effect an exposure.

3. In a roll film photographic camera as claimed in claim 1, the gear train comprising a toothed wheel carried by the shutter winding spindle, a toothed wheel carried by the film winder spindle, an intermediate toothed wheel normally in mesh with both the aforesaid toothed wheels, means for rotating the toothed wheel on the shutter winding spindle, the rotation of which through the medium of the intermediate toothed wheel rotates the toothed wheel on the film winding spindle, a spring-loaded lever pivoted about the centre of the shutter spindle and the intermediate toothed wheel mounted towards one end of such lever, said lever having a cam surface, a stud on the means for rotating the toothed wheel on the shutter spindle, said stud engaging the cam surface and moving it to disengage the intermediate toothed wheel from the tooth wheel on the film winding spindle upon the film being moved to present a fresh portion for exposure, said stud retaining the intermediate toothed wheel in its disengaged position during further rotation of the shutter spindle.

4. In a roll film photographic camera as claimed in claim 1, the gear train comprising a toothed wheel carried by the shutter winding spindle, a toothed wheel carried by the film winder spindle, an intermediate toothed wheel normally in mesh with both the aforesaid toothed wheels, means for rotating the toothed wheel on the shutter winding spindle, the rotation of which through the medium of the intermediate toothed wheel rotates the toothed wheel on the film winding spindle, a spring-loaded lever pivoted about the centre of the shutter spindle and the intermediate toothed wheel mounted towards one end of such lever, said lever having a cam surface, a stud on the means for rotating the toothed wheel on the shutter spindle, said stud engaging the cam surface and moving it to disengage the intermediate toothed wheel from the tooth wheel on the film winding spindle upon the film being moved to present a fresh portion for exposure, said stud retaining the intermediate toothed wheel in its disengaged position during further rotation of the shutter spindle, a shutter release, and means operated thereby engaging the opposite end of the lever for holding the intermediate toothed wheel out of engagement with the toothed wheel on the film winding spindle during an exposure.

5. In a roll film photographic camera as claimed in claim 1, the gear train comprising a toothed wheel carried by the shutter winding spindle, a toothed wheel carried by the film winder spindle, an intermediate toothed wheel normally in mesh with both the aforesaid toothed wheels, a toothed wheel operable from the exterior of the camera and in permanent mesh with the toothed wheel on the shutter spindle, two studs on the toothed wheel operable from the exterior of the camera arranged at different radial distances from its centre, and a pivoted stop lever adapted to be engaged by one or other of the studs.

ALFRED JOSEPH DENNISS.
WALTER DOCKREE.